June 14, 1960 E. M. USAB Re. 24,837
FLOATING WHARF STRUCTURE MADE OF CONCRETE FLOAT UNITS
Original Filed July 29, 1957 3 Sheets-Sheet 1
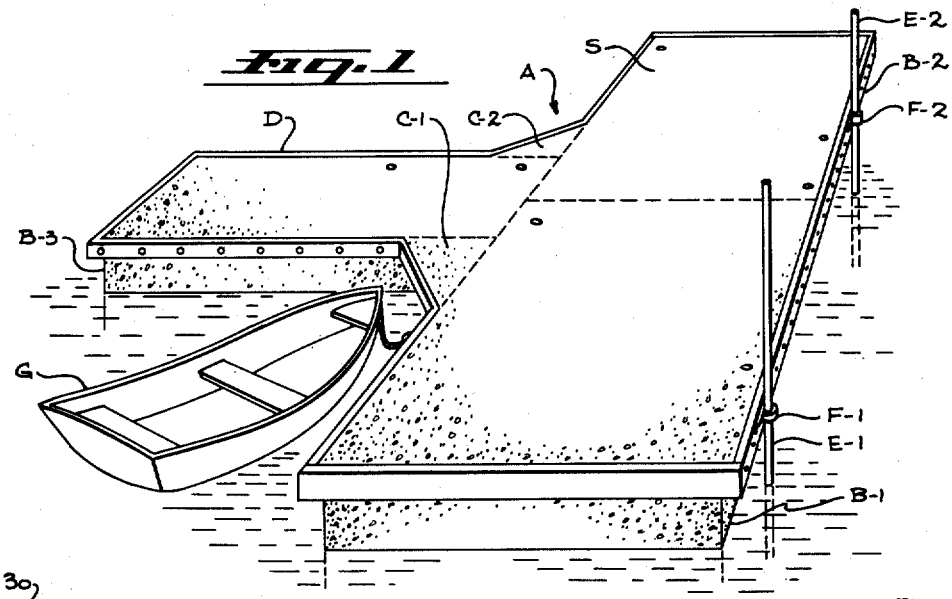
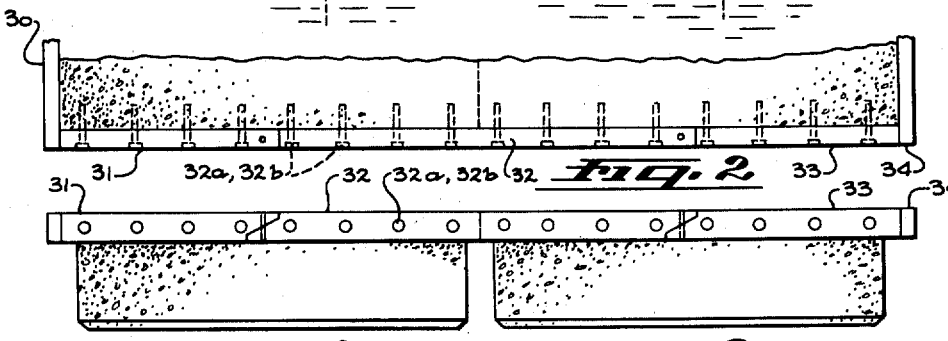
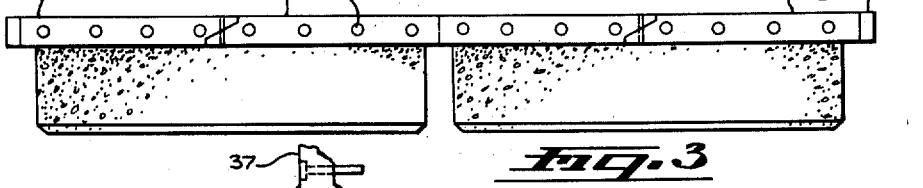
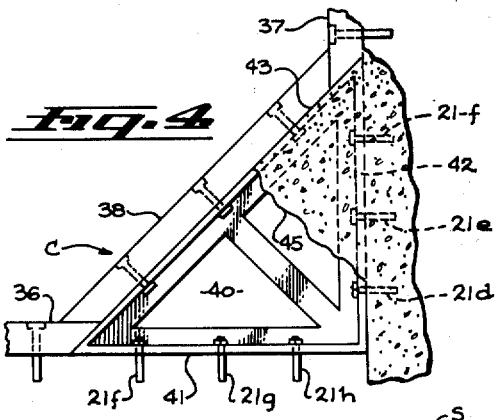
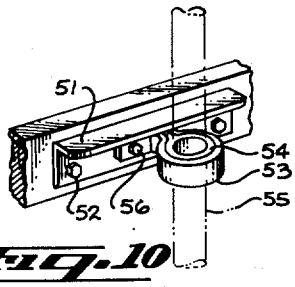
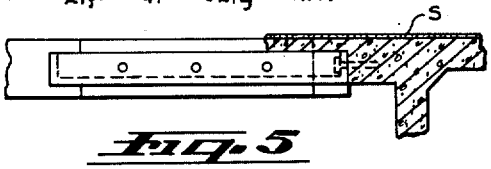
INVENTOR
ERNEST M. USAB
BY
WILLIAM C. BABCOCK
ATTORNEY

FLOATING WHARF STRUCTURE MADE OF CONCRETE FLOAT UNITS

Original Filed July 29, 1957 3 Sheets-Sheet 2

INVENTOR.
ERNEST M. USAB

BY

WILLIAM C. BABCOCK
ATTORNEY

FLOATING WHARF STRUCTURE MADE OF CONCRETE FLOAT UNITS

Original Filed July 29, 1957 3 Sheets-Sheet 3

INVENTOR
ERNEST M. USAB

BY William C. Babcock
ATTORNEY

United States Patent Office

Re. 24,837
Reissued June 14, 1960

24,837

FLOATING WHARF STRUCTURE MADE OF CONCRETE FLOAT UNITS

Ernest M. Usab, 95 Via di Roma, Long Beach 3, Calif.

Original No. 2,857,872, dated Oct. 28, 1958, Ser. No. 674,901, July 29, 1957. Application for reissue Oct. 9, 1959, Ser. No. 845,581

10 Claims. (Cl. 114—.5)

Matter enclosed in heavy brackets [ ] appears in the original patent but forms no part of this reissue specification; matter printed in italics indicates the additions made by reissue.

The present invention relates to a floating wharf structure made up of concrete float units and in which the walkway is provided by the surfaces of the float units themselves.

In constructing marinas or small boat harbors it is desirable to utilize a floating wharf structure which is accessible to land and has one or more fingers extending out into the body of water. In the past, various types of pontoons and floats have been used for this purpose. The types of structures used heretofore have been found, however, to be unduly expensive and to have a short useful life, particularly when used in salt water locations as is often the case.

An object of the present invention, therefore, is to provide a floating wharf structure having low initial cost and a long useful life.

Another object of the invention is to provide a floating wharf structure which may be assembled "in domino fashion," that is, which is made up of a number of similar separate units which can be combined together in any one of a variety of patterns as may be desired.

A further object of the present invention is to provide, for use in a floating wharf structure, a novel float unit having many years of useful life under constant exposure to salt water and the accompanying salty atmosphere.

Yet a further object of the present invention is to provide, for use in a floating wharf structure, a float unit which is made entirely of concrete and other low-cost materials.

Still another object of the present invention is to provide, for use in a floating wharf structure, novel float units which can be combined together in any one of a variety of patterns, and connecting means, for tying the float units together, arranged in such a way that partial disassembly thereof for the purpose of maintenance or repair can be conveniently and quickly accomplished.

*A still further object of the invention is to provide a concrete wharf structure that not only floats at a desired position on a body of water, but has the necessary flexibility to permit it to yield to the wave motion of a large body of water without impairment of its function or sustaining any damage.*

*Yet another object of the invention is to provide a wharf structure that is in the main, formed from concrete, a material ideally suited for this purpose due to its resistance to deterioration by water or moisture, but a material which has heretofore been rejected for wharf structures due to its lack of resiliency and low tensile strength.*

In accordance with the present invention the above and other objects are accomplished by providing a float unit in the form of a waterproof hollow box whose top, bottom and walls are made entirely of reinforced concrete. Along each side of the box and adjacent to its top surface there is provided a row of fastening means, such as bolts, which are imbedded in the concrete and protrude outwardly. The top surface of each float unit is coated with an abrasive non-slip material in order to serve as a walkway. A number of individual float units may be permanently fastened together by utilizing wooden tie rails placed along the sides of the respective float units, and fastened to the bolts or other fastening means.

The above and other objects of the invention will be more readily understood from the following description in conjunction with the accompanying drawing, in which:

Figure 1 is a perspective view of a floating wharf structure as provided by the present invention, comprising three interconnected float units;

Figure 2 is a plan view of the right-hand side of the wharf structure of Figure 1 illustrating how the two adjacent float units thereof are interconnected by means of a tie rail;

Figure 3 is an elevational view of the adjacent float units and interconnecting tie rail of Figure 2;

Figure 4 is a plan view of a corner bracket used in the wharf structure of Figure 1 to connect a finger extension to the main walkway;

Figure 5 is an elevational view of the corner bracket of Figure 4;

Figure 10 is a perspective view of an anchor ring suitable for connection to an iron pipe piling; [and]

Figure 6:
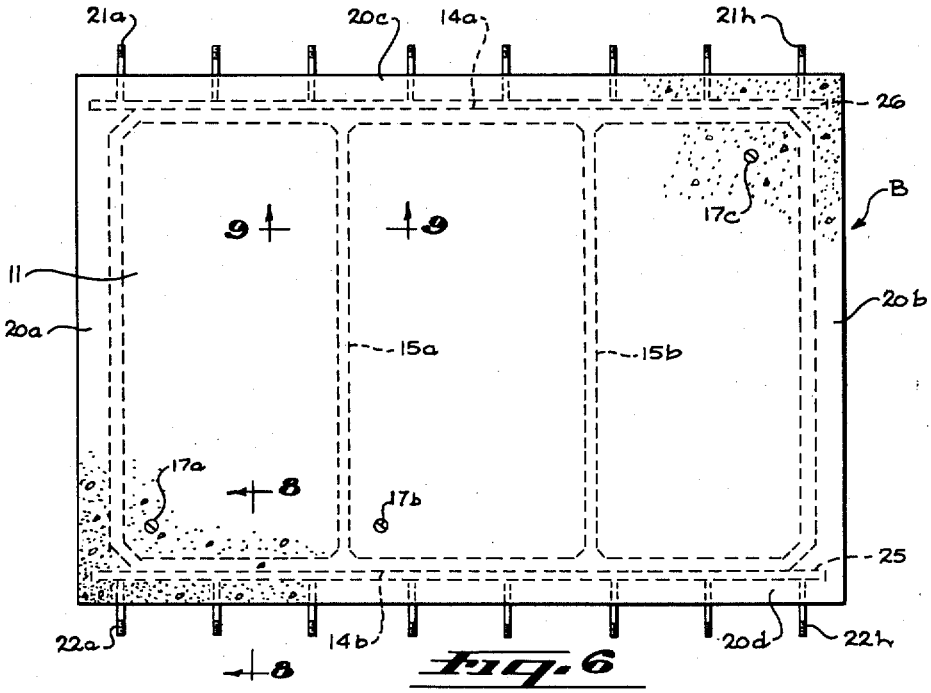
Figure 6 is a plan view of any one of the float units used in the wharf structure of Figure 1.
Figure 7:
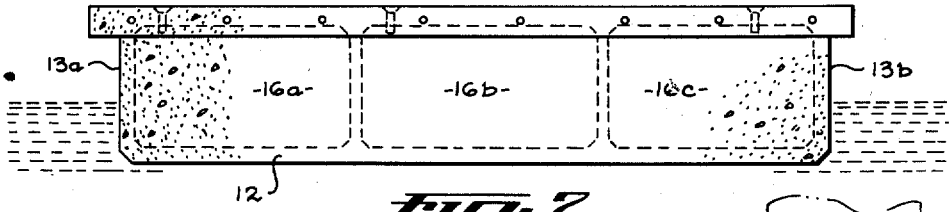
Figure 7 is a side elevation view of the float unit of Figure 6.

Reference is now made to Figure 1 illustrating one form of floating wharf structure in accordance with the present invention. In Figure 1 the wharf A is shown as including separate float units B–1, B–2 and B–3. Float units B–1 and B–2 are aligned in a straight line to provide a main walkway while float unit B–3 provides a finger extending therefrom at a right angle. Corners C–1 and C–2 connect float unit B–3 to the main walkway.

The wharf structure of Figure 1 is tied together by means of a tie rail D extending all the way around the exposed sides and ends of the float units as well as the corner sections C–1 and C–2. Anchor means for the floating wharf includes iron pipe pilings E–1 and E–2 to which the main walkway is movably fastened by means of anchor couplings F–1 and F–2, respectively. A boat G tied to the wharf illustrates the manner of usage thereof. The entire surface S of the wharf structure, exclusive of the tie rail, is a coating of an abrasive non-slip material.

In describing in detail the floating wharf structure of Figure 1 it will be of great convenience to refer to Figures 2 to 10 of the drawings concurrently, and in order to preclude any ambiguity of description, like reference numerals are used throughout the drawings to identify like parts.

Each float unit B consists essentially of a hollow box whose length and width are substantially greater than its depth and whose top, bottom and walls are made of reinforced concrete. A top slab 11 and a bottom slab 12 are exactly parallel to each other since the box has a uniform depth throughout. End walls 13a, 13b interconnect the top and bottom portions of the box, whose basic structure is completed by side walls 14a, 14b. The inner portion of the box contains transverse partition walls 15a, 15b which are parallel to end walls 13a, 13b and serve to divide the box into three waterproof compartments 16a, 16b, 16c. On the top surface of the box are provided a number of inspection plugs, one for each water-tight compartment, and identified as 17a, 17b, 17c.

Figure 8:
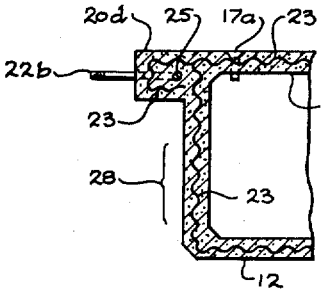
Figure 8 is a partial vertical section view taken on the line 8—8 of Figure 6.
Figure 9:
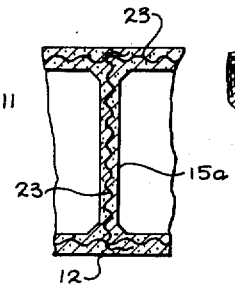
Figure 9 is a partial vertical section view taken on the line 9—9 of Figure 6.

A reinforced concrete flange protrudes outwardly from the sides and ends of the box and provides an extension of the top surface thereof, the flange portions at the ends of the box being identified as 20a, 20b and those at the sides of the box as 20c, 20d. These flanges effectively form a buffer means to receive impacts and to space propellers on boats being docked away from the adjacent vertical wall of a float unit. The side flanges have imbedded therein a plurality of outwardly protruding, spaced-apart threaded bolts which are aligned with the top surface of the box. Thus bolts 21a . . . 21h protrude from flange 20c while bolts 22a . . . 22h protrude from flange 20d. In each portion of the box structure the concrete is reinforced at approximately the center line thereof by a galvanized wire mesh screen 23. As shown in Figure 8, the reinforcing screen in top slab 11 is curled over at the outer edges thereof to provide reinforcement for the adjoining flange portion, such as flange 20d. As shown in Figures 8 and 9, the reinforcing screen although arranged in a number of separate pieces has sufficient interweaving, overlap or other interconnection of adjoining screen portions so as to assure a firm structural support for the entire float unit.

Tie rail D of Figure 1 includes a number of separate segments such as 30, 31, 32, 33, 34. Those segments such as 31, 32, 33 which pass along a side flange of one or more of the float units are provided with holes adapted to fit over the corresponding bolts. As illustrated by segment 32, it is convenient to have each segment of the tie rail extend from approximately the middle of one float *to* approximately the middle of the next. The ends of each tie rail segment instead of being square are cut at an angle from the horizontal so as to provide strength of the interconnections, but at the same time to permit convenient and rapid removal of a particular tie rail segment without disturbing adjoining segments.

Each tie rail segment is provided with bolt holes such as 32a, 32b (as shown in Figures 2 and 3), which are recessed to receive nuts which may then be tightened down on the respective bolts. It is convenient to thereafter fill the bolt hole with some type of water-repellent material to preclude the bolts and nuts from rusting. It may also be convenient to cover the tie rail with rubber or other weather-stripping to provide the maximum protection thereof against the water and the weather. If maintenance or repair work needs to be done, a particular segment of the tie rail may be removed simply by removing the nuts from the bolts to which they are fastened. The tie rail segment may then be slipped horizontally off the bolts.

Each corner section C includes a bracket 40 having first and second mounting surfaces 41 and 42 arranged at a right angle to each other, and a third mounting surface 43 providing the hypotenuse of a triangle for which surfaces 41 and 42 represent the legs. As shown in Figure 4, the corner bracket may be utilized for joining two float units by fastening mounting surface 41 to bolts 21f, 21g, 21h and mounting surface 42 to bolts 21d, 21e, 21f. These connections correspond to those used for corner section C–2 of Figure 1. For corner section C–1 the connections (not shown) would include the fastening of mounting surface 42 to bolts 22f, 22g, 22h of float B–3, and the fastening of mounting surface 41 to bolts 21c, 21d, 21e of float unit B–1.

Corner bracket 40 is made of steel in order to provide the necessary strength. As shown in Figure 4 tie rail segments such as 36, 37 associated with the sides of the corresponding float units are cut in a vertical plane at a suitable angle to abut against mounting surface 43 of corner bracket 40, while tie rail segment 38 lies along the main portion of mounting surface 43 and interconnects the other two tie rail segments. The structure of the corner section is completed by a cover member 45 which may be reinforced concrete or other suitable material and which fits over the top of corner bracket 40 to provide an integral portion of walkway surface S.

Figure 11:
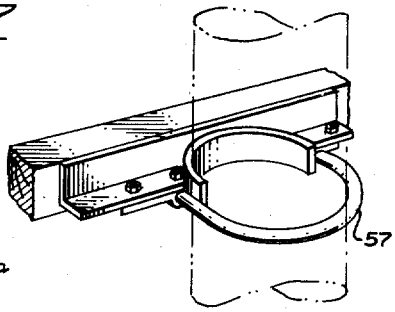
Figure 11 is a perspective view of an anchor ring suitable for connection to a large wooden piling; *and*

In Figure 10 there is illustrated a perspective view of an anchor coupling such as F–1, F–2 of Figure 1. A horizontal angle bracket 51 is fastened by any suitable means such as bolts 52 to the corresponding tie rail. An anchor ring 53 provided on its inner surface with a pad 54 is fitted around an iron pipe piling 55 and is then fastened by suitable means such as bolts 56 to the horizontal bracket 51. An alternative version suitable for use with a large wooden piling is shown in Figure 11, in which the ring is formed from a section of pipe 57 which is suitably bent to fit around the piling and whose length may be adjusted to conform to the piling diameter at the water surface.

In constructing float units in accordance with the present invention it is imperative that the concrete have high strength, low weight, and be waterproof in the presence of salt water. Concrete of the type known as Rocklite has been found satisfactory for this purpose. The only portion of the wharf structure subject to appreciable deterioration is the tie rails, for which a suitable material is treated Douglas fir. The surface of the float units may be supplied with a coating of abrasive materials, or the concrete itself may be finished in such a manner as to provide the desired non-slip characteristics.

The particular floating wharf structure illustrated in Figure 1 is of course only exemplary, and it is possible in accordance with the described techniques to interconnect a great many float units to provide numerous basic walkways, fingers extending therefrom, and so on. It has also been found convenient from the commercial standpoint to provide the float units in several sizes, such as 3′ x 8′, 4′ x 8′ and 6′ x 8′. It may also be desirable to omit the transverse dividing walls such as 15a, 15b, depending upon the size and other characteristics of the particular float unit.

Through suitable adjustment of the design parameters it has been found possible to provide concrete float units of the type herein described which are safe and reliable, having an anticipated useful life in salt water locations of twenty years, and whose flotation capacities are equal to those of prior type float units. At the same time the concrete float units are smaller in size, have substantially lower initial cost, and are far more economical when the expense is evaluated over the useful life span of the structure. As an example of the flotation capacities, a unit of the type described having a length of approximately eight feet, width of approximately six feet, and depth of one foot, seven and one-half inches has been found to rise above the water eleven inches under conditions of no load, and to be able to sustain a load of fifty-two pounds per square foot of surface area before submerging. In view of these performance characteristics the float unit has been found far superior to comparable units of the past.

*Concrete, as is well known, has little strength in tension, but very substantial strength in compression. Wharf structures are in most instances installed in bodies of water in which the structures are at least periodically subjected to excessive wave action, strong wind and currents, and occasionally a severe laterally directed shock due to a boat inadvertently contacting the structure. Unified wharf structures formed of concrete have in the past been unsuccessful, for the stresses imparted thereto by wave action, strong currents and other shocks have set up tensional forces therein that break and crack the concrete, and with subsequent weakening and disintegration of the structure.*

There are several reasons for supplying the float unit of the present invention with a flange surrounding its top surface. First, the flange is approximately twice as thick as the top slab, or main deck, and being thoroughly reinforced it provides a heavy beam which protects the top slab from bending or breaking. In this connection it may be noted that the reinforcing material is arranged in the form of a hollow square tube (see Figure 8) whose sides lie near the respective surfaces of the flange. A second reason for the flange is to provide a point of strength or buffer means to receive impacts, as from a boat which is being docked. A third reason is to protect the main body of the float from being damaged by any protruding object such as, for example, the propeller of a boat. A fourth reason is to support the bolts or other fastening means, and to distribute the forces received therefrom throughout the structure. In this connection it may be noted in Figure 6 that tie bars 25, 26 run almost the entire length of the respective side flanges and are welded to the inner ends of the bolts mounted therein. A fifth reason is to provide a space between adjacent float units at the water surface, so that tides or currents may readily pass therethrough.

Although the float unit has been described as comprising a wire mesh screen arranged to form a fully enclosed rectangular structure, it is actually preferred not to reinforce the float unit at cetain points. More particularly, it is preferred to omit the wire mesh screen reinforcing material in the exterior walls of the unit near the water line. The region in which it is thus preferred to omit the reinforcing screen is indicated in Figure 8 by a bracket and the numeral 28. This particular portion of the reinforcing screen is not needed for structural purposes, and is subject to undesirable oxidation because the concrete is periodically changing from wet to dry and vice versa, and for those reasons it is preferable to omit the reinforcing material altogether.

In the preceding description it has been stated that the stud bolts are on the sides of the float unit, and this has been illustrated in Figure 6 of the drawing, however, it is sometimes advantageous to connect two or more float units together so that the longer dimension of each becomes the width of the walkway. The "sides" of the float unit are then its shorter edges, and the stud bolts are mounted thereon. Where a particular float unit is intended to be used at the end of a walkway or pier it is preferred to incorporate stud bolts on both sides and on one end of the float unit so that tie rails can be fastened thereon accordingly.

In Figure 1 of the drawing there has been illustrated a main walkway with a finger consisting of a float unit B–3 extending therefrom at a right angle. While the finger may be connected to the walkway at a juncture between two float units, such as the juncture between float units B–1 and B–2 as illustrated in Figure 1, it is also possible to have the finger connect to the side of a single float unit at the middle portion thereof.

One of the hazards of boating or sailing in small craft is the danger of fire. The present invention provides a substantially fireproof wharf structure in which the only combustible portions are the tie rails. Thus a small boat in which the motor has caught fire, for example, may land at the wharf of the present invention and bring its occupants to safety since there is practically no danger whatsoever of burning up the wharf.

The floating wharf structure provided by the present invention has the necessary flexibility so that it can yield to the wave motion of a large body of water, without impairment of its function and without sustaining any damage. Where float units having a length of eight feet are used, relatively violent water produces a maximum deflection at each joint of three-fourths of a degree. All of this deflection is taken up by the wooden tie rails. The fact that the abutting flanges of adjoining float units have a depth which is relatively small compared to the length of each float unit is necessary in order to permit proper flexing of the wharf structure to occur.

A concrete deck or walkway has many advantages, including long life and the ease of providing a non-slip surface. In the float unit of the present invention the sub-structure has two important functions: first, to support the main deck and protect it against distortion and breakage, which would otherwise inevitably occur where a thin slab of concrete is subjected to constant agitation; and second, to provide the water displacement necessary for flotation.

Figure 12:
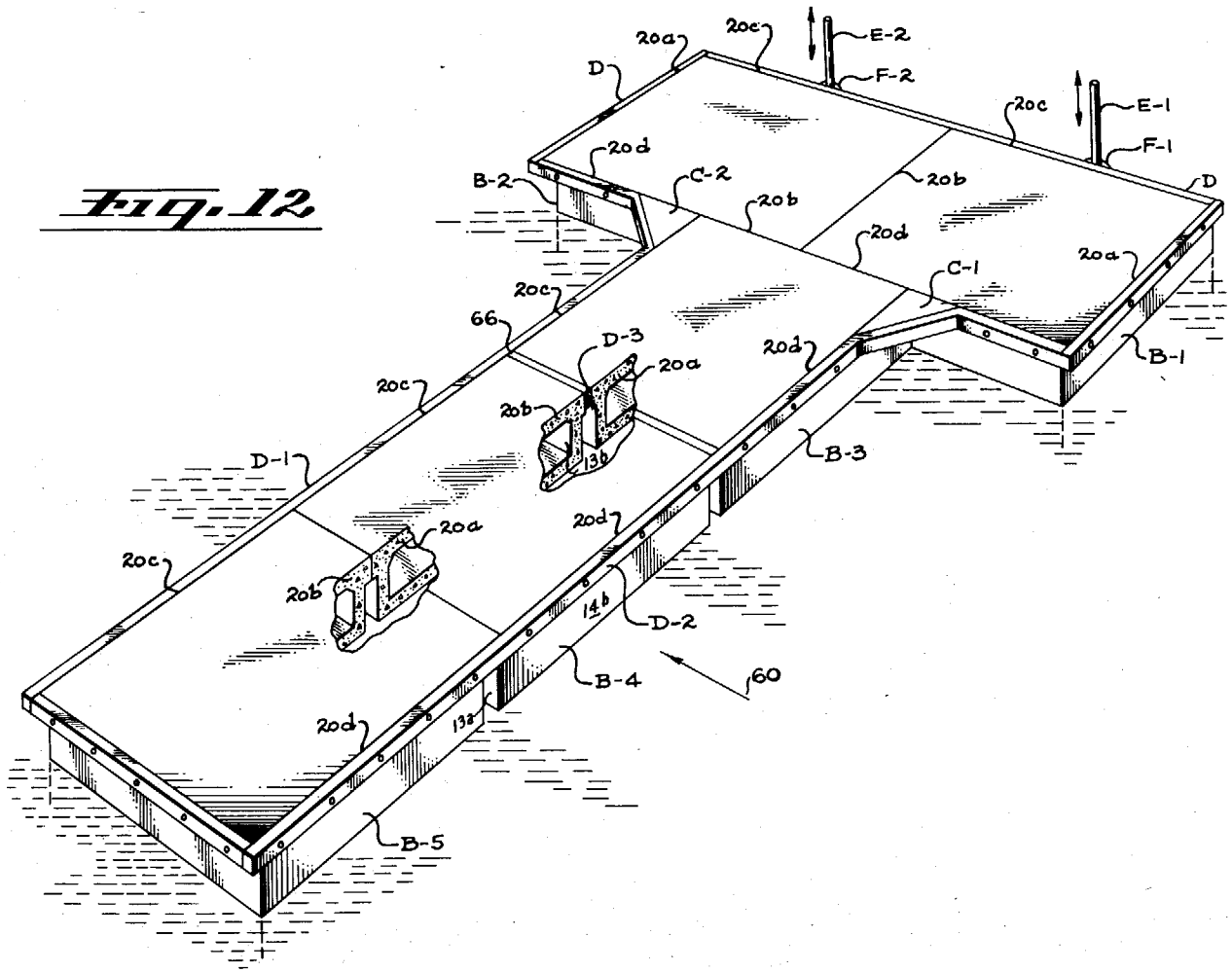
*Figure 12 is a perspective view of the wharf structure shown in Figure 1 with additional units added thereto.*

*Another float pattern is shown in Figure 12 that not only illustrates the versatility of the invention as being arrangeable in any desired configuration, but also illustrates the flexibility of the wharf structure within predetermined limits when subjected to a strong wave action in the direction of the arrow 60. The arrangement of the float units shown in Figure 12 is the same as illustrated in Figure 1, but with two additional float units B–4 and B–5 having been disposed in longitudinal alignment with float B–3. The tie rails D have been extended along the sides of float units B–4 and B–5, and removably affixed thereto in the same manner as previously described in connection with floats B–1, B–2 and B–3.*

*For clarity of explanation, the tie rails D connecting float units B–3, B–4 and B–5 have been further identified by the notations D–1 and D–2.*

*When the wharf structure is subjected to a strong wave motion in the direction of the arrow 60, the structure of course tends to move in the direction of the arrow, but is restrained from so doing by the piles E–1, E–2 and anchor couplings F–1, F–2.*

*The positioning of the piles E–1, E–2 and anchor couplings F–1, F–2 prevents the float units B–1 and B–2, shown in Figure 12, from pivoting relative thereto when subjected to wave motion in the direction of the arrow 60. However, with the couplings F–1, F–2 being slidably movable relative to the piles E–1, E–2, the float units B–1 and B–2 can move upwardly and downwardly when subjected to such wave motion, or changes in the water level brought on by tide action.*

*The tie rails D–1 and D–2 previously mentioned are resilient. This resiliency is of the utmost importance, for when the wharf structure is subjected to a sudden shock by wave action, inadvertent bumping by a boat or the like, the tie rails are stressed in tension and temporarily deformed from their normally straight alignment. The stress imparted to the tie rails D–1 and D–2 by such sudden shock is transferred to the buffer portions 20a, 20b, 20c and 20d of each float unit as a compressive force which the concrete defining same can withstand.*

*Float unit B–3 likewise will not be moved appreciably by a current in the direction of the arrow 60, for unit B–3 is connected cantilever fashion to units B–1 and B–2 by the rigid corner sections C–1 and C–2. Obviously, float unit B–3 cannot be moved by a current in the direction of arrow 60 if the float units B–1 and B–2 to which it is rigidly connected remain stationary when subjected to the current.*

*The float units B–4 and B–5 are connected to float unit B–3 by the resilient tie rails D–1 and D–2.*

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

[1. A float unit comprising a wire mesh screen arranged to form a fully enclosed rectangular structure whose width and length are substantially greater than its depth; a layer of waterproof concrete of substantially uniform thickness encasing said wire mesh screen to provide a waterproof hollow box having a bottom surface adapted to be normally submerged in a body of water and a normally upwardly facing top surface; a concrete flange protruding outwardly from the sides and ends of said box and providing an extension of said top surface; a coating of abrasive non-slip material on said top surface; and a row of spaced-apart threaded bolts protruding outwardly from said flange along each of said sides in a direction parallel to said top surface.]

[2. A float unit as claimed in claim 1 which further includes at least one waterproof wall transversely arranged within said hollow box to provide at least two separate waterproof compartments, and a plurality of inspection plugs in said top surface, one for each of said compartments.]

3. A floating wharf structure comprising at least two float units, each of said float units including a wire mesh screen arranged to form a fully enclosed rectangular structure whose width and length are substantially greater than its depth, a layer of concrete [of substantially uniform thickness] encasing said wire mesh screen and providing a waterproof hollow box having a bottom surface adapted to be normally submerged in a body of water and a normally upwardly facing top surface, a [concrete] flange protruding outwardly from the sides and ends of said box and providing an extension of said top surface, and a row of spaced-apart threaded bolts protruding outwardly from said flange along each of said sides in a direction parallel to said top surface; means holding an end of one of said float units in abutting relationship with an end of the other of said float units; said means comprising a wooden tie rail aligned on one side of each of said float units and fastened to the respective bolts thereof to provide a connecting link therebetween; said top surface constituting a walkway means [and having a coating of abrasive non-slip material thereon].

4. A floating wharf structure as claimed in claim 3 in which each of said float units further includes at least one waterproof wall transversely arranged within said hollow box to provide at least two separate waterproof compartments, and a plurality of inspection plugs in said top surface, one for each of said compartments.

5. A floating wharf structure comprising at least three float units, each of said float units including a wire mesh screen arranged to form a fully enclosed rectangular structure whose width and length are substantially greater than its depth, a layer of concrete [of substantially uniform thickness] encasing said wire mesh screen and providing a waterproof hollow box having a bottom surface adapted to be normally submerged in a body of water and a normally upwardly facing top surface, a concrete flange protruding outwardly from the sides and ends of said box and providing an extension of said top surface, and a row of spaced-apart threaded bolts protruding outwardly from said flange along each of said sides in a direction parallel to said top surface; an elongate wooden tie rail having a portion of its length abutting along one side of a first one of said float units and fastened to the bolts thereon, and an adjoining portion of its length abutting along one side of a second one of said float units and fastened to the bolts thereon to hold one end of said first float unit in abutting relationship with one end of said second float unit; first and second iron brackets, each having two mounting surfaces forming a right angle, said first and second brackets having one mounting surface thereof abutting along sides opposite to the sides of said first and second float units to which said tie rail is secured, respectively, and fastened to the bolts thereon, said first and second brackets being spaced apart the width of one of said float units, a third one of said float units having one of its ends abutting against said sides opposite to the sides of said first and second floats to which said tie rail is secured and having its two sides engaged between the other mounting surfaces of said first and second brackets, respectively, and bolted thereto; said top surface constituting a walkway means [and having a coating of abrasive non-slip material thereon].

6. A floating wharf structure as claimed in claim 5 in which each of said float units further includes at least one waterproof wall transversely arranged within said hollow box to provide at least two separate waterproof compartments, and a plurality of inspection plugs in said top surface, one for each of said compartments.

[7. A float unit adapted for attachment to another float unit to form a floating wharf, comprising a wire mesh screen arranged to form a fully enclosed rectangular structure whose width and length are substantially greater than its depth; a layer of waterproof concrete of substantially uniform thickness encasing said wire mesh screen surface adapted to be normally submerged in a body of water and normally upwardly facing top surface; a concrete flange protruding outwardly from the sides and ends of said box and providing an extension of said top surface, said concrete flange having a width sufficient to constitute a buffer means for said float unit; and fastening means secured to opposite sides of said float unit adapted for mounting a tie rail on said flange.]

*8. A floating wharf structure for use on a body of water which comprises: a plurality of float units disposed in sequence on said body of water in a predetermined pattern, with each of said units including a horizontally disposed reinforced concrete slab of rectangular shape that defines a flat upper surface and pairs of concrete end walls and side walls which extend down from said slab to a concrete bottom to define a buoyant enclosed box, with said side walls and end walls adjacent the outer portions of said slab being thickened to provide a continuous buffer which extends horizontally around said unit to reinforce same against externally applied forces, said buoyant box supporting said slab at an elevated position above said body of water, and said upper surfaces of said slabs when said units are sequentially disposed providing a walkway; a plurality of fastening means affixed to at least one of the side portions of said buffers; a plurality of parallel, laterally spaced resilient tie rails being of substantial thickness extending along the side portions of said buffers and extending outwardly therefrom, said tie rails affixed to said buffers by said fastening means, with said tie rails holding said float units together but said rails temporarily deflecting within predetermined limits to permit said structure to yield when subjected to externally applied forces, and said tie rails projecting outwardly sufficiently from said side walls to protect the same from inadvertent contact with a boat; and anchor means at least partially mounted on said float units for holding said float units in said desired pattern at a fixed position on said body of water, but permitting said float units to move vertically due to wave and tide action of said body of water.*

*9. A floating wharf structure as defined in claim 8 in which at least one rigid section is provided that extends between two of said float units, said section being horizontally disposed and lying in substantially the same plane as said buffers on said float unit between which it extends, with said section being affixed to said buffers by said fastening means, and a concrete cover member is provided that is supported in said section at such an elevation that the upper surface thereof and the upper surfaces of said float units are in a common horizontal plane.*

*10. A floating wharf structure as defined in claim 8 in which said tie rails are formed of wood and said fastening means are a plurality of metallic threaded members that extend outwardly to pass through bores formed in said tie rails, and a plurality of nuts are provided that engage the portions of said members passing through said bores to removably hold said tie rails on said threaded members, which tie rails possess sufficient resiliency to enable the same to return to non-deflected positions after said externally applied forces abate.*

*11. A wharf structure which when floated on a body of water defines an elongate walkway having parallel side edges disposed above the surface of said water, com-*

*prising: a plurality of hollow float units having flat horizontal upper surfaces which cooperatively provide said walkway when said units are sequentially disposed and floating on said body of water, each of which units include a partially submerged concrete box having a bottom with side walls and end walls extending upwardly therefrom, a continuous horizontally disposed buffer that is connected to and extends around the upper portions of said side walls and end walls, and a rectangular concrete slab supported by said walls, with said slab defining said flat upper surface; two elongate, laterally spaced, resilient tie rails of substantial thickness that abut against said buffers and project outwardly from said boxes sufficiently to protect the same from inadvertent contact with a boat; and fastening means connecting said tie rails to said buffers to hold said units together in said sequential relationship, with said structure when said units are so held being capable of yielding to wave action within a limited range, which range is determined by the degree of resiliency of said tie rails.*

*12. A wharf structure as defined in claim 11 wherein said fastening means comprise a plurality of threaded members that project outwardly from the portions of said buffers against which said tie rails abut, said tie rails having a plurality of bores formed therein through which said members project, and a plurality of nuts is provided which engage the outer extremities of said threaded members to removably affix said rails to said units.*

*13. A wharf structure as defined in claim 12 wherein the surface area of said walkway is increased by the provision of a rigid metal frame that extends between two of said units, said frame having openings formed therein through which at least a portion of said threaded members on said two units project to support said frame thereon, and a concrete slab is provided of such configuration as to be supported by said frame and is of such thickness that when so supported the upper surface thereof is flush with the upper surfaces of said slabs on said two units.*

References Cited in the file of this patent or the original patent

UNITED STATES PATENTS

| | | |
|---|---|---|
| 933,314 | Lackey | Sept. 7, 1909 |
| 1,018,488 | Gorsuch | Feb. 27, 1912 |
| 1,310,461 | Williams | July 22, 1919 |
| 1,457,006 | Simpson | May 29, 1923 |
| 1,474,336 | Long | Nov. 13, 1923 |
| 2,157,959 | Knight | May 9, 1939 |
| 2,604,866 | Alcorn | July 29, 1952 |

FOREIGN PATENTS

| | | |
|---|---|---|
| 29,939 | Great Britain | 1912 |
| 489,444 | Great Britain | July 27, 1938 |